United States Patent
Streuer et al.

(10) Patent No.: US 9,847,522 B2
(45) Date of Patent: Dec. 19, 2017

(54) CONNECTING POLE FOR A RECHARGEABLE BATTERY AND RECHARGEABLE BATTERY HOUSING

(75) Inventors: Peter Streuer, Hannover (DE); Anne-Laure Ledoux, Langenhagen (DE)

(73) Assignee: Johnson Controls Autobatterie GmbH & Co. KGAA, Hannover (DE)

( * ) Notice: Subject to any disclaimer, the term of this patent is extended or adjusted under 35 U.S.C. 154(b) by 585 days.

(21) Appl. No.: 13/583,192

(22) PCT Filed: Mar. 7, 2011

(86) PCT No.: PCT/EP2011/001103
§ 371 (c)(1),
(2), (4) Date: Nov. 6, 2012

(87) PCT Pub. No.: WO2011/110317
PCT Pub. Date: Sep. 15, 2011

(65) Prior Publication Data
US 2013/0052519 A1 Feb. 28, 2013

(30) Foreign Application Priority Data

Mar. 9, 2010 (DE) .......................... 10 2010 010 772
Jun. 3, 2010 (DE) .......................... 10 2010 022 584

(51) Int. Cl.
*H01M 2/02* (2006.01)
*H01M 2/30* (2006.01)
(Continued)

(52) U.S. Cl.
CPC ............ *H01M 2/30* (2013.01); *H01M 2/024* (2013.01); *H01M 2/06* (2013.01); *H01M 2/1252* (2013.01);
(Continued)

(58) Field of Classification Search
CPC ............ H01M 2/02; H01M 2/06; H01M 2/30; H01M 2/305; H01M 2/307; H01M 2/024; H01M 2/1252; H01M 2/021; Y02T 90/124
See application file for complete search history.

(56) References Cited

U.S. PATENT DOCUMENTS 4,859,547 A * 8/1989 Adams .................... H01M 2/06
29/623.2
5,349,840 A 9/1994 Ratte et al.
(Continued)

FOREIGN PATENT DOCUMENTS

CN 101176908 A 5/2008
DE 3942175 A1 6/1991
(Continued)

OTHER PUBLICATIONS

PCT Notification of Transmittal of Translation of the International Preliminary Report on Patentability, Int'l. Appln. No. PCT/EP2011/001103.
(Continued)

*Primary Examiner* — Lisa S Park
(74) *Attorney, Agent, or Firm* — Boardman & Clark LLP

(57) ABSTRACT

A connecting pole for a rechargeable battery is disclosed. The connecting pole (1) has a connecting section (2) in which a pole terminal can be attached to the connecting pole (1). The connecting pole (1) has an attachment section (3) in which the connecting pole (1) can be attached in a housing part (5) of the battery. The attachment section (3) has a labyrinth section (4). The outer wall (6) of the connecting pole (1) has at least one circumferential projection (7, 8) in the labyrinth section (4). The circumference of outer wall (6) of the connecting pole (1) increases in the direction pointing away from the connecting section (2) in a section of the labyrinth section (4) which is not provided with a circum-
(Continued)

Figure 1:
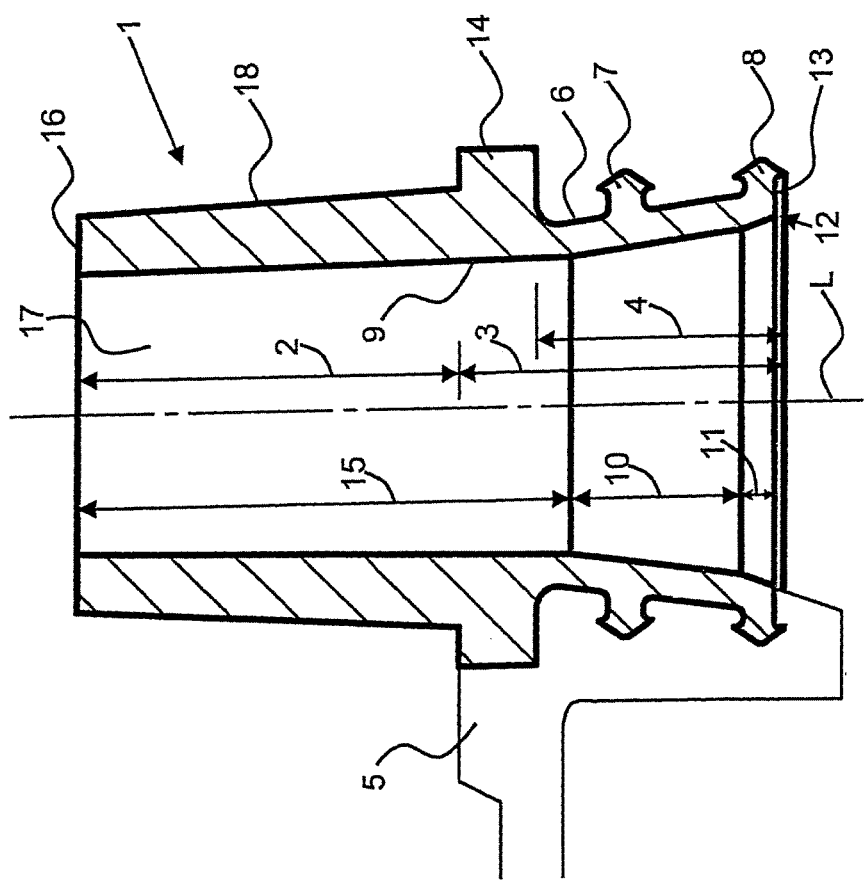

ferential projection (7, 8). Also disclosed is a rechargeable battery housing or a part of said rechargeable battery housing having at least one connecting pole.

16 Claims, 7 Drawing Sheets

(51) Int. Cl.
  *H01M 2/06* (2006.01)
  *H01M 2/12* (2006.01)
(52) U.S. Cl.
  CPC ............ *H01M 2/307* (2013.01); *H01M 2/021* (2013.01); *Y02T 90/124* (2013.01)

(56) References Cited

U.S. PATENT DOCUMENTS

| | | | |
|---|---|---|---|
| 5,422,202 A | 6/1995 | Spiegelberg et al. | |
| 5,425,170 A | 6/1995 | Spiegelberg et al. | |
| 5,589,294 A | 12/1996 | Spiegelberg et al. | |
| 5,632,173 A | 5/1997 | Spiegelberg et al. | |
| 5,791,183 A | 8/1998 | Spiegelberg et al. | |
| 6,030,723 A | 2/2000 | Nagano et al. | |
| 6,033,801 A | 3/2000 | Casais | |
| 6,312,852 B1 | 11/2001 | Wagner | |
| 6,644,084 B1 | 11/2003 | Spiegelberg et al. | |
| 7,021,101 B2 | 4/2006 | Spiegelberg et al. | |
| 7,052,332 B2 | 5/2006 | Heller et al. | |
| 7,163,763 B2 | 1/2007 | Spiegelberg et al. | |
| 7,338,539 B2 | 3/2008 | Peterson et al. | |
| 7,628,049 B2 | 12/2009 | Spiegelberg et al. | |
| 7,641,100 B2 | 1/2010 | Spiegelberg et al. | |
| 7,905,384 B1 | 3/2011 | Spiegelberg et al. | |
| 7,946,033 B2 | 5/2011 | Gibellini | |
| 7,985,496 B2 | 7/2011 | Spiegelberg et al. | |
| 8,033,153 B1 | 10/2011 | Spiegelberg et al. | |
| 8,168,323 B2 | 5/2012 | Richter et al. | |
| 8,701,743 B2 | 4/2014 | Cain et al. | |
| 2002/0002772 A1 | 1/2002 | Hirano et al. | |
| 2004/0132353 A1* | 7/2004 | Heller | H01M 2/307 439/754 |
| 2005/0147882 A1 | 7/2005 | Ratte et al. | |
| 2007/0122686 A1 | 5/2007 | Alexandrovichserov et al. | |
| 2007/0122696 A1 | 5/2007 | Richter et al. | |
| 2008/0038633 A1 | 2/2008 | Ratte et al. | |
| 2008/0241677 A1 | 10/2008 | Garcia et al. | |
| 2010/0116455 A1 | 5/2010 | Ratte et al. | |
| 2011/0045336 A1 | 2/2011 | Ratte et al. | |
| 2015/0303437 A1 | 10/2015 | Streuer et al. | |

FOREIGN PATENT DOCUMENTS

| | | |
|---|---|---|
| DE | 42 41 393 C1 | 7/1994 |
| DE | 42 41 393 C2 | 7/1994 |
| DE | 10 2005 046 256 A1 | 9/2005 |
| DE | 202005013772 U1 | 8/2006 |
| EP | 0402635 A1 | 12/1990 |
| EP | 0 590 284 A2 | 4/1994 |
| EP | 601268 B1 | 12/1996 |
| EP | 0 836 237 A1 | 4/1998 |
| EP | 0836237 * | 4/1998 |
| EP | 1347522 A1 | 9/2003 |
| IT | 1278026 B1 | 11/1997 |
| JP | 6-223812 A | 9/1994 |
| WO | 2005067513 A2 | 7/2005 |
| WO | 2011110317 A1 | 9/2011 |
| WO | 2014080012 A1 | 3/2014 |

OTHER PUBLICATIONS

International Search Report in International Application No. PCT/EP2011/001103.
Written Opinion of the International Searching Authority in International Application No. PCT/EP2011/001103.

* cited by examiner

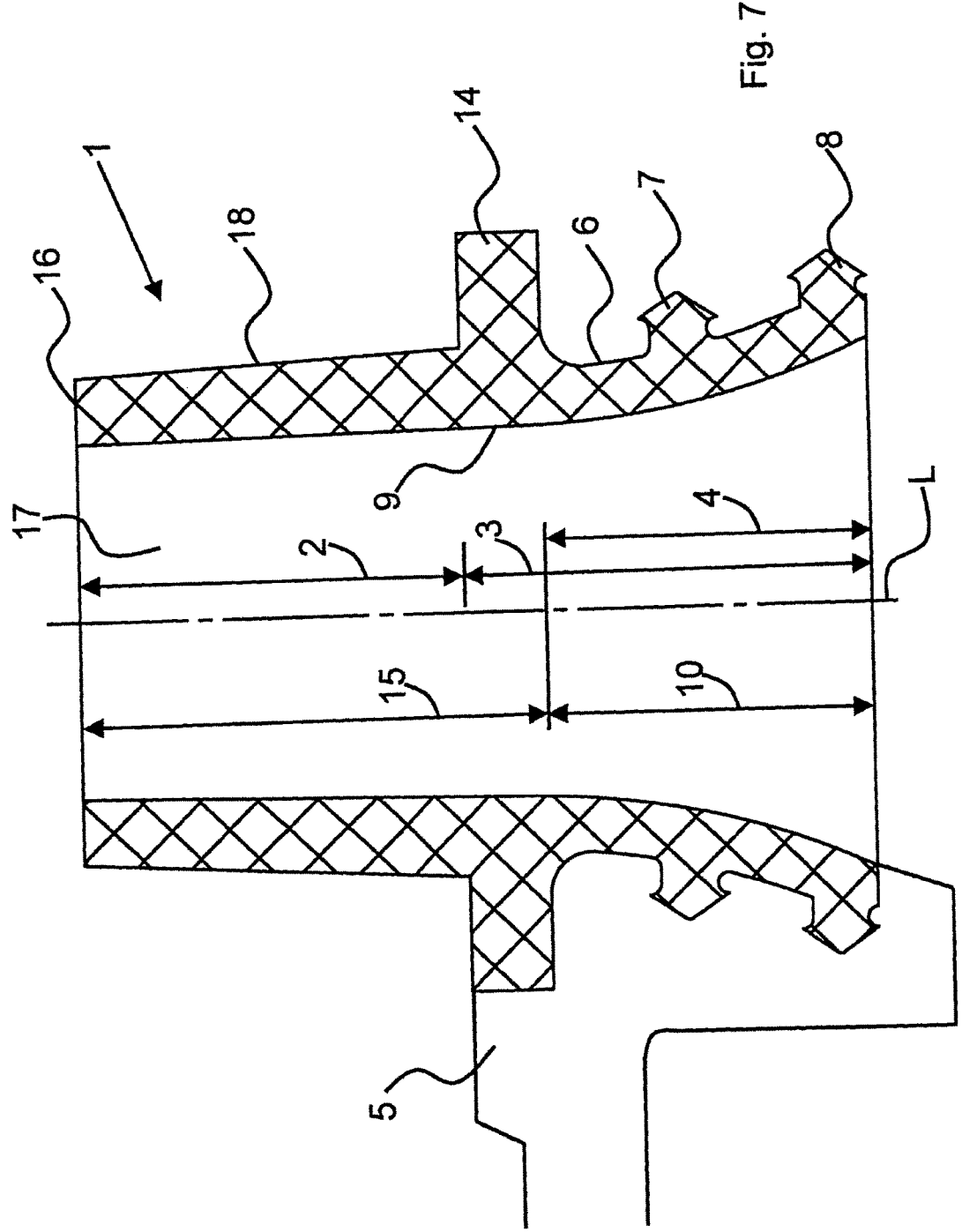

CONNECTING POLE FOR A RECHARGEABLE BATTERY AND RECHARGEABLE BATTERY HOUSING

The invention relates to a connecting pole for a rechargeable battery as claimed in the preamble of claim 1. The invention also relates to a rechargeable battery housing or a part of said rechargeable battery housing having at least one connecting pole of this kind as claimed in claim 15.

Connecting poles for rechargeable batteries serve to establish electrical contact between the rechargeable battery and electrical devices which are to be supplied with power by the rechargeable battery. In the case of a starter battery for a motor vehicle, the corresponding pole terminals are screwed to two connecting poles of the starter battery.

A connecting pole for a rechargeable battery is known from DE 42 41 393 C2. The connecting pole described in that document has a base part with circumferential channels, it being possible for said base part to be inserted into a housing of the rechargeable battery. The circumferential channels form a labyrinth seal with a plastic which fills the channels.

The invention is based on the object of specifying a connecting pole with a lower weight than the known connecting pole. The invention is also based on the object of specifying a corresponding rechargeable battery housing having a connecting pole of this kind with a lower weight.

This object is achieved by virtue of the invention specified in claims 1 and 15. The dependent claims specify advantageous refinements of the invention.

According to the invention, it is proposed that the circumference of the outer wall of the connecting pole increases in the direction pointing away from the connecting section in at least one section of the labyrinth section which is not provided with a circumferential projection. As a result, smaller outer circumferences of the connecting pole can be realized close to the connecting section, that is to say in the upper region of the labyrinth section, as a result of which the quantity of material required for the connecting pole in this region can be reduced.

A circumference of the outer wall of the connecting pole in a section of the labyrinth section which is not provided with a circumferential projection is therefore to be understood as wall sections in which no circumferential projection is arranged, either entirely or partially. These wall sections are therefore wall sections of the outer wall in which there are no transitions to circumferential projections either. Therefore, on account of the invention, it is possible to reduce the outer circumference in the direction of the connecting section starting from the lower end of the connecting pole. Therefore, provision can be made, for example, to conically increase the size of the outer wall of the connecting pole in the direction pointing away from the connecting section in at least one section of the labyrinth section outside the at least one circumferential projection. As a result, the outer circumference of the connecting pole is increased in size in an approximately linear manner in the direction pointing away from the connecting section in the at least one section of the labyrinth section outside the at least one circumferential projection.

In this case, the term "section" refers to sections in the longitudinal direction of the connecting pole, that is to say in the direction of the longitudinal axis L which is illustrated in FIG. 1.

As mentioned, material can advantageously be saved in the upper region of the labyrinth section by virtue of the invention. Furthermore, a sufficient degree of mechanical stability of the connecting pole can be ensured at the same time. The saving in material of the connecting pole, which is produced from lead for example, leads to a noticeable reduction in the weight of the connecting pole and therefore also of a housing of a rechargeable battery which is provided with the connecting pole. The saving in material is advantageously also accompanied by a saving in cost. The outer wall of the connecting pole advantageously runs in a conical or monolithic hyperboloid manner in at least one section, specifically in a section in which the circumferential projection or the circumferential projections is/are not arranged.

The invention also makes it possible to reduce the diameter of the at least one circumferential projection which is provided in the labyrinth section. This results in a further saving in material and weight. A plurality of circumferential projections can also be provided.

According to an advantageous development of the invention, provision is made for the circumference of the outer wall of the connecting pole to increase in the direction pointing away from the connecting section in the regions which are not provided with a circumferential projection throughout the labyrinth section. As a result, the saving in material and therefore the saving in weight can be maximized.

According to an advantageous development of the invention, the labyrinth section has a smaller extent in the longitudinal direction of the connecting pole than the attachment section. This allows further elements to be provided in the attachment section without adversely affecting the labyrinth section.

The circumferential projection can be realized with different profiles. A ring-like shape may be mentioned as a basic shape for the circumferential projection. According to an advantageous development of the invention, the at least one circumferential projection has a hook-like profile. The hook-like region of the profile can, for example, adjoin the outer face of a ring-shaped projection in accordance with the above-mentioned basic shape. The hook-like profile effectively assists the formation of a labyrinth between the material of the connecting pole and the plastic of the surrounding housing. The sealing effect of the labyrinth can be further improved as a result.

According to an advantageous development of the invention, the connecting pole is hollow on the inside. The circumference of the inner wall of the connecting pole increases in the direction pointing away from the connecting section in at least a first section of the labyrinth section. In an advantageous development of the invention, that section of the inner wall which increases in terms of circumference can be designed to overlap with that section of the outer wall which increases in terms of circumference. According to an advantageous development of the invention, the inner wall and the outer wall of the connecting pole run parallel at least in sections in the longitudinal direction of said connecting pole. As a result, constant wall thicknesses can be realized at least in sections in the longitudinal direction of the connecting pole. Overall, the connecting pole can be further optimized in terms of material savings and weight as a result. This development can be realized, for example, by the angle relative to the longitudinal axis of the connecting pole, which angle is formed by a conical section of the inner wall, being substantially equal to the angle of a conical section of the outer wall relative to the longitudinal axis of the connecting pole.

According to an advantageous development of the invention, provision is made for the first section, in which the circumference of the inner wall increases, to not project beyond the section in which the circumference of the outer wall increases in the longitudinal direction of the connecting pole. In particular, provision may be made for the first section, in which the circumference of the inner wall increases, to extend into the connecting section.

According to an advantageous development of the invention, provision is made for the first section, in which the circumference of the inner wall increases, to project beyond the section in which the circumference of the outer wall increases in the longitudinal direction of the connecting pole. This allows for the provision of further specially shaped sections of the inner wall.

According to an advantageous development of the invention, provision is made for the connecting pole to be hollow on the inside and for the circumference of the inner wall of the connecting pole to increase in the direction of the labyrinth section in the connecting section.

According to an advantageous development of the invention, provision is made for the circumference of the inner wall and/or of the outer wall to increase in a monotonically linear or arcuate manner. The increase in the circumference can therefore take place with a linear contour, so that the inner wall and/or the outer wall run/runs conically at least in sections. An arcuate contour can advantageously also be provided, for example with a hyperboloid profile. Combined conical and arcuate sections can also advantageously be provided on the connecting pole on the inner wall and/or on the outer wall.

According to an advantageous development of the invention, the arcuate increase in the circumference is progressive in the direction pointing away from the connecting section. As a result, the angular difference between the outer wall and/or the inner wall relative to a longitudinal axis of the connecting pole increases starting from the connecting section 2.

According to an advantageous development of the invention, the outer wall and/or the inner wall have/has a monolithic hyperboloid profile in the longitudinal direction of the connecting pole. In this case, all contours which are produced by conical sections can be provided, in particular a hyperbola, parabola, cone or ellipse. It is likewise advantageous to provide a profile following an exponential function at least in sections on the outer wall and/or the inner wall.

The connecting pole can, in particular, be rotationally symmetrical. In this case, the preceding statements relating to the circumference of the inner wall or the outer wall relate to their respective diameters.

According to an advantageous development of the invention, the inner wall of the connecting pole is conically increased in size in the direction pointing away from the connecting section in at least a second section of the labyrinth section. The inner wall forms a larger angle relative to the longitudinal axis of the connecting pole in the second section than in the first section. A gradual increase in the size of the conical angle in this way allows for the provision of inner regions of the connecting pole with a gradual centring effect during mounting of a rechargeable battery. The inner, hollow region of the connecting pole is intended to accommodate a connecting pin which extends through the connecting pole into the interior of the connecting section. The connecting pin is connected to electrode plate sets in the interior of the rechargeable battery. During production of a rechargeable battery, a lower housing part is first provided with the electrode plate sets which are already fitted with connecting pins. A cover of the rechargeable battery, in which connecting poles are formed using injection-molding technology, is then placed on the lower housing part. The aim here is to provide simple and quick centring of the connecting poles relative to the connecting pins in order to enable quick and efficient production of a rechargeable battery. The conical inner sections simplify this centring operation.

A further advantage is that a lower mandrel for internally sealing off the injection-molded compound from the surrounding area can be quickly positioned in the second conical section during the production of the cover of the rechargeable battery.

According to an advantageous development of the invention, the second section is on that side of the first section which is averted from the connecting section.

According to an advantageous development of the invention, the circumference of the inner wall of the connecting pole changes in a discontinuous manner at that end of the connecting pole which is averted from the connecting section. A discontinuity of this kind causes a sudden change in the inside diameter. As a result, it is possible, for example, for an annular end section of the connecting pole to be realized with a diameter which is increased in size relative to the first or the second section.

According to an advantageous development of the invention, the connecting pole has a circumferential projection with a tooth system on the outer circumference in the attachment section between the connecting section and the labyrinth section. The tooth system can advantageously form a rotation-prevention means, this preventing undesirable rotation of the connecting pole in the material of the rechargeable battery housing. In an advantageous development of the invention, the tooth system has a number of teeth in the range of from 6 to 9. In particular, a number of 8 teeth has proven particularly advantageous and is a good compromise between the mechanical stability of the teeth of the connecting pole and the ability to hold the connecting pole in the plastic material of the rechargeable battery housing. An excessively high number of teeth necessarily leads to a reduction in the dimensions of the individual teeth, as a result of which the stability of the individual teeth decreases. An excessively low number of teeth leads to a decrease in the effectiveness of the rotation-prevention arrangement since the ability to hold the connecting pole in the plastic material of the rechargeable battery housing decreases.

According to an advantageous development of the invention, the connecting pole is hollow on the inside. The inner wall of the connecting pole has a conical profile in the connecting section. According to an advantageous development of the invention, the conical profile of the inner wall of the connecting pole extends into the attachment section. In an advantageous refinement of the invention, provision may be made for the first section to adjoin the conical profile of the inner wall in the connecting section and for the second section of the inner wall of the connecting pole to adjoin said first section.

An advantageous rechargeable battery housing or a part of said rechargeable battery housing has at least one connecting pole of the above-described kind. The attachment section of the at least one connecting pole is advantageously embedded in a rechargeable battery housing part by means of injection-molding technology. The rechargeable battery housing part can be, for example, the cover of the rechargeable battery.

The invention will be explained in greater detail in the text which follows with reference to exemplary embodiments using drawings, in which FIG. 1—is a sectional illustration through a connecting pole in the longitudinal direction and FIG. 2—shows a profile of the inner wall of the connecting pole and FIG. 3—is a sectional illustration through a further embodiment of a connecting pole in the longitudinal direction and FIG. 4—shows plan views of embodiments of the connecting pole and FIGS. 5 to 7—are sectional illustrations through further embodiments of the connecting pole in the longitudinal direction.

In the figures, identical reference symbols are used for elements which correspond to one another.

FIG. 1 is a sectioned illustration through a connecting pole 1 in the longitudinal direction. The connecting pole 1 has a connecting section 2, an attachment section 3 and a labyrinth section 4.

The connecting pole 1 has an outer wall 18 and an upper termination surface 16 on its outer face in the connecting section 2. A circumferential projection 14, which can, in principle, have an approximately annular shape, is arranged on the outer face of the connecting pole 1 in the attachment section 3, adjacent to the connecting section 2. The circumferential projection 14 can also have the tooth system, which will be explained in greater detail in the text which follows, on the outer circumference. An outer wall 6 on the outer face of the connecting pole 1 adjoins the circumferential projection 14, said outer wall being arranged in the labyrinth section 4. The outer wall 6 is interrupted by circumferential projections 7, 8 which each have a hook-like profile. The connecting pole 1 can, apart from the tooth system, be in the form of, for example, a substantially rotationally symmetrical component.

FIG. 1 shows a detail of a housing part 5 of the rechargeable battery which is integrally formed on the connecting pole 1 using an injection-molding process, by way of example in the left-hand region of the connecting pole 1. As can be seen, the connecting pole is embedded in the material of the housing part 5 in the attachment section 3 at its outer face. A labyrinth is formed by the circumferential projections 7, 8, 14, said labyrinth ensuring effective sealing of the interior of the rechargeable battery from the surrounding area.

The connecting pole 1 is hollow. Sections of an inner wall 9 run conically at different angles of the inner wall 9 relative to the longitudinal axis L in a cavity 17 which is formed in the connecting pole 1. A first section 10 of the conically running inner wall 9 and a second section 11 are illustrated in the labyrinth section 4. The second section 11 adjoins the first section 10 on that side of the connecting pole 1 which is opposite the connecting section 2. A further conically running section 15 of the inner wall 9 is provided on the other side of the first section 10, said further conically running section extending from the upper termination surface 16 into the labyrinth section 4.

An approximately annular section 13 adjoins the second section 11 in the cavity 17. In this case, the diameter of the cavity 17 is abruptly increased in size at point 12.

Figure 2:
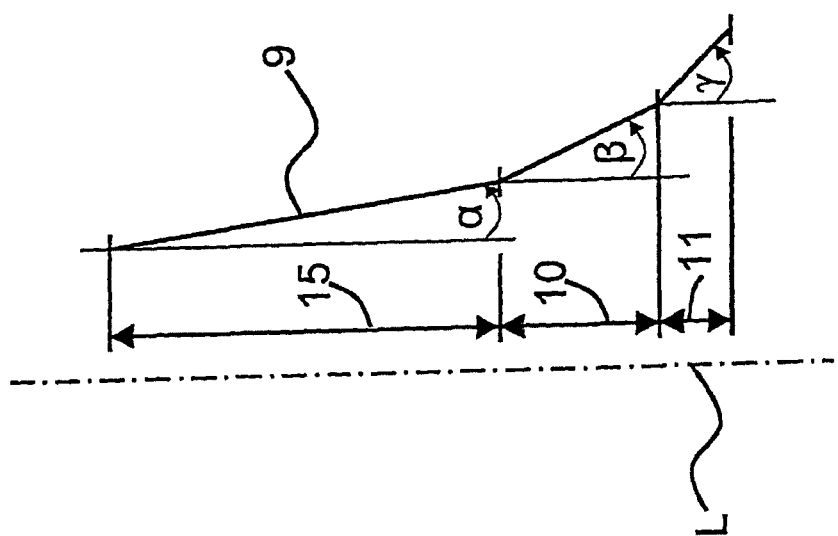

FIG. 2 schematically shows the profile of the inner wall 9 in the sections 15, 10, 11. In section 15, the inner wall 9 forms an angle α relative to the longitudinal axis L. In the first section 10, the inner wall 9 forms an angle β relative to the longitudinal axis L. In the second section 11, the inner wall 9 forms an angle γ relative to the longitudinal axis L. Advantageously, $\alpha < \beta < \gamma$. This produces a monotonic increase in the conical angle from the upper termination surface 16 in the direction of the opposite end of the connecting pole 1.

Figure 3:
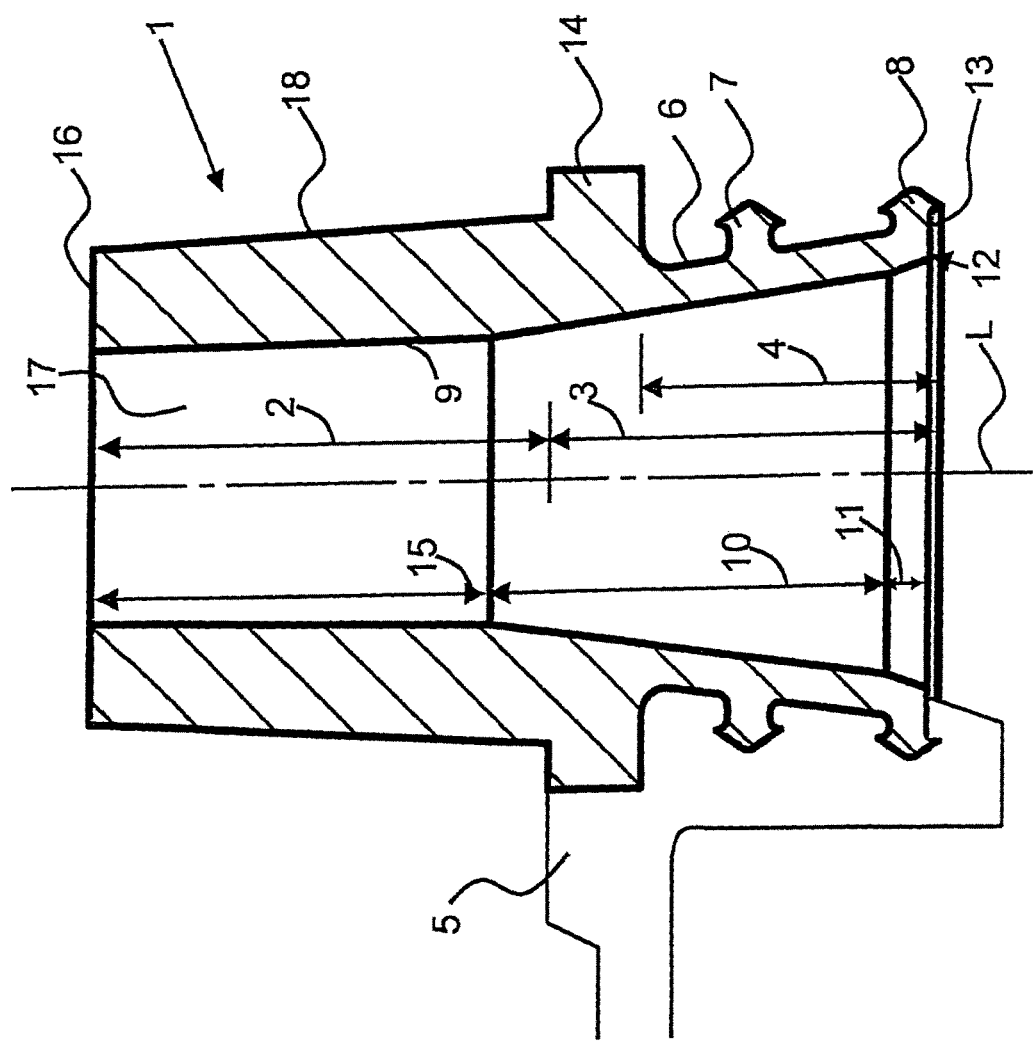

FIG. 3 illustrates an embodiment of a connecting pole 1 which is reduced in size. The outside diameter of the connecting pole in the connecting section 2 corresponds to the outside diameter of the connecting pole 1 according to FIG. 1. However, the cavity 17 has a smaller diameter compared to FIG. 1. In the embodiment according to FIG. 3, the first section 10 of the conically running inner wall 9 extends beyond the attachment section 3 into the connecting section 2.

Figure 4:
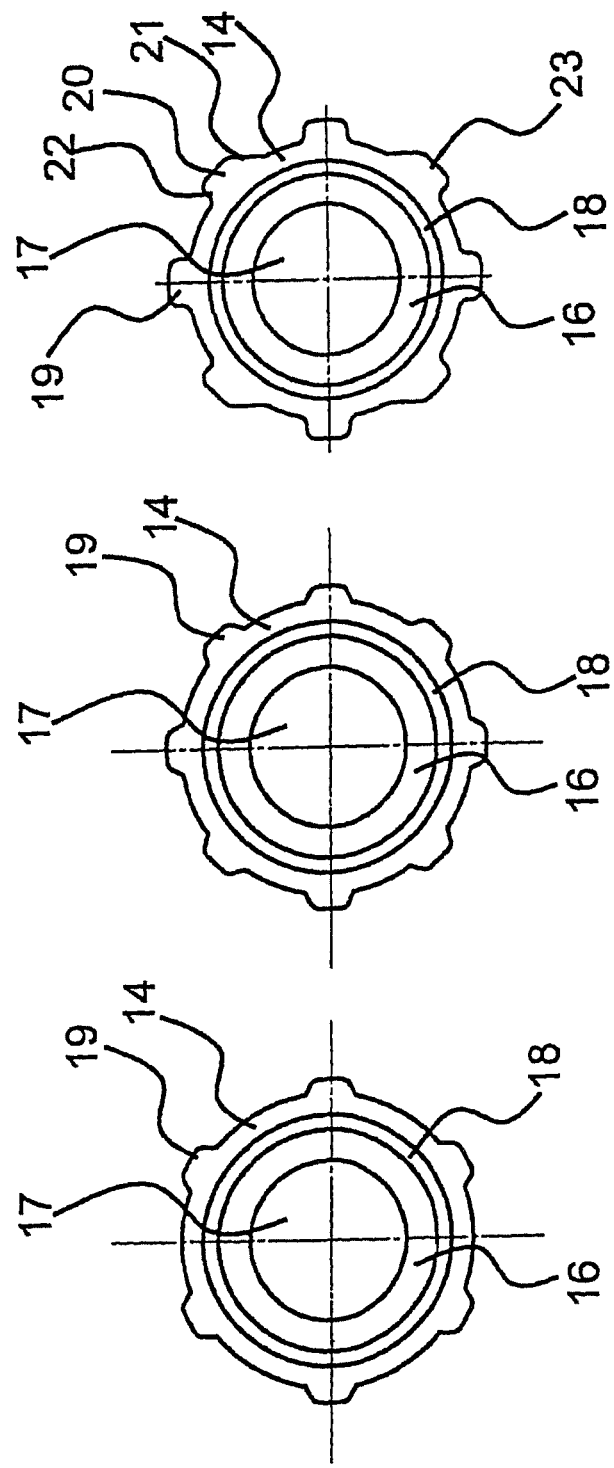

FIG. 4 shows, in FIGS. 4 a), 4 b) and 4 c), various embodiments of the connecting pole 1 in plan view, specifically from the side of the termination surface 16. All three embodiments show the upper termination surface 16, the outer side wall 18, the inner cavity 17 and the circumferential projection 14.

The circumferential projection 14 has an outer tooth system which is illustrated by teeth 19, 20, 23. The teeth 19, 20, 23 prevent the connecting pole from rotating in the plastic material of the rechargeable battery housing. In this case, FIG. 4 a) shows an advantageous embodiment in which six teeth 19 are arranged such that they are uniformly distributed over the circumference of the connecting pole 1. FIG. 4 b) shows an advantageous embodiment with eight teeth 19 which are arranged such that they are uniformly distributed over the circumference of the connecting pole 1.

In this respect, FIG. 4 c) corresponds to the embodiment according to FIG. 4 b), with teeth 20, 23 being provided with asymmetrical tooth flanks 21, 22 as an advantageous development in FIG. 4 c). Therefore, the tooth flank 21 has a smaller angle relative to the outer circumference of the circumferential projection 14 than the tooth flank 22. The tooth 23 is formed with asymmetrical tooth flanks similarly to the tooth 20. In this case, the tooth 23 is arranged with mirror-image symmetry to the tooth 20. The tooth flanks 21 which are formed with a smaller angle provide the option of producing the connecting pole by means of a split mold. As a result, the cheeks can be easily separated from the connecting pole when they are removed from the mold since there is no undercut in the separation direction.

Figure 5:
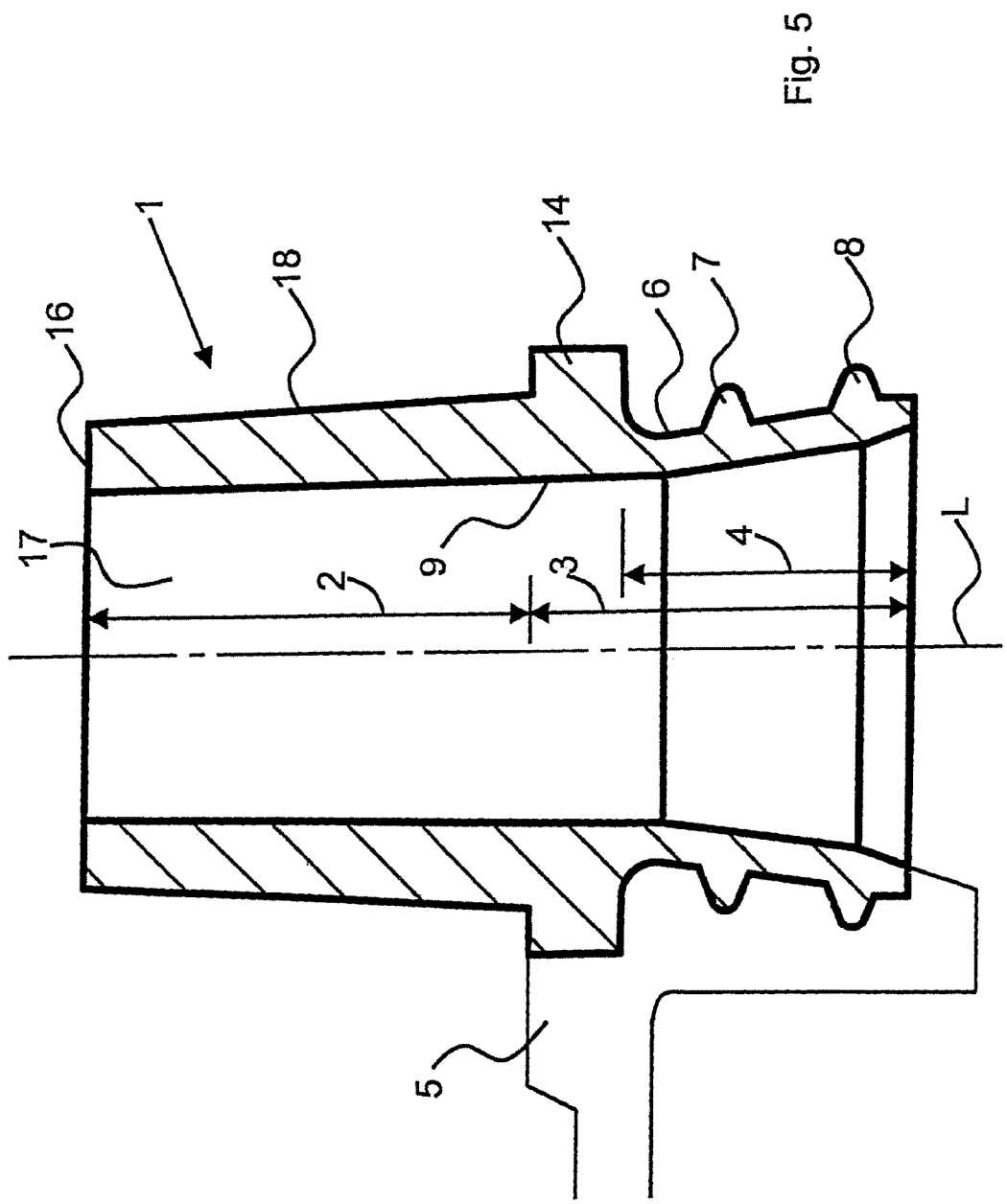
Figure 6:
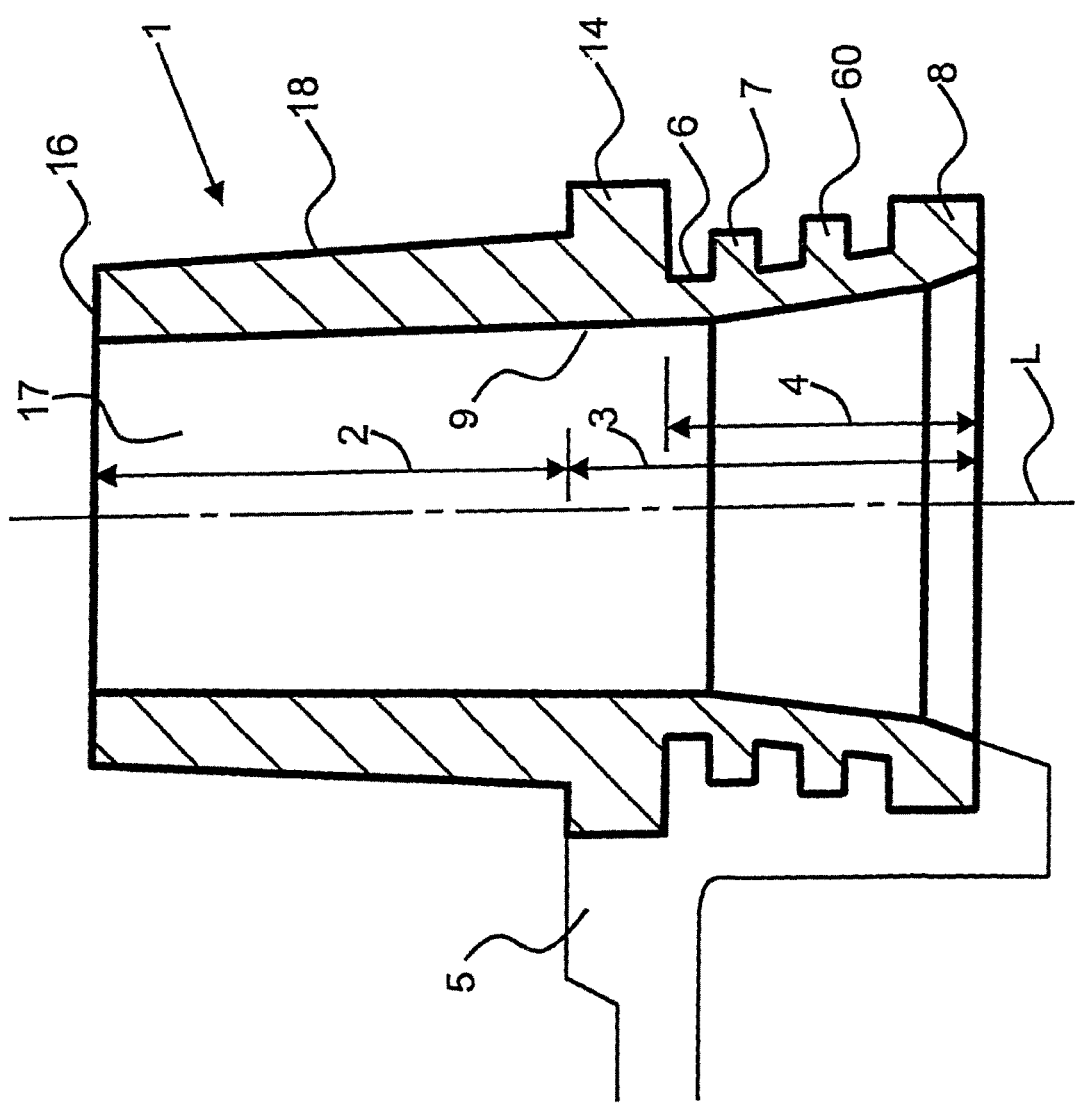

FIGS. 5 and 6 show further embodiments of the connecting pole 1. The embodiments according to FIGS. 5 and 6 have advantageous alternative profiling options for the circumferential projections in the labyrinth section 4 compared to the embodiment according to FIG. 1. In addition, the annular section 13 is not provided in the lower region of the cavity 17 in the embodiments according to FIGS. 5 and 6.

Circumferential projections 7, 8 on the outer circumference of the connecting pole 1 in the labyrinth section 4 with a rounded profile are proposed according to FIG. 5. Two circumferential projections 7, 8 with substantially the same profile are provided.

Circumferential projections 7, 8, 60 on the outer circumference of the connecting bushing 1 in the labyrinth region 4 are proposed according to FIG. 6, said circumferential projections having a substantially rectangular, in particular square, profile. Three circumferential projections 7, 8, 60 are provided in one advantageous refinement. In this case, the circumferential projection 8 which is provided at that end of the connecting pole 1 which is averted from the connecting section 2 has a larger cross section than the circumferential projections 7, 60 in one advantageous refinement.

The above-described embodiments of the connecting poles each have a linear profile in the longitudinal direction, that is to say have corresponding conical sections. FIG. 7 shows an embodiment of a connecting pole 1 with an arcuate profile of the inner wall 9 and the outer wall 6 in the attachment section 3. Connecting poles according to FIG. 7 are used, in particular, for the commercial vehicle sector. As can be seen, the outer wall 6 and the inner wall 9 run parallel in the attachment section 3 at least in the regions in which no circumferential projection 7, 8 is arranged, and therefore a constant wall thickness is formed in these sections. The outer circumference and the inner circumference of the connecting pole 1 increase continuously in the downward direction, that is to say in the direction of the insertion face for a pole bushing, in the attachment section and, respectively, in the labyrinth section 4. As a result, a saving in material can be made on the outer circumference in the above the circumferential projection 8 as far as the circumferential projection 14. As a result, the commercial vehicle connecting pole illustrated in FIG. 7 is also more lightweight than known commercial vehicle connecting poles.

The invention claimed is:

1. A connecting pole for a rechargeable battery, comprising the following features:
   a) the connecting pole has a connecting section in which a pole terminal can be attached to the connecting pole, said connecting section being defined between a first horizontal plane and a second horizontal plane, which is below the first horizontal plane;
   b) the connecting pole has an attachment section in which the connecting pole can be attached in a housing part of a rechargeable battery, said attachment section being completely defined between said second horizontal plane and a third horizontal plane, which is below the second horizontal plane, wherein said second horizontal plane is aligned with an outer surface of the housing part of the rechargeable battery;
   c) the attachment section has a labyrinth section;
   d) an outer wall of the connecting pole has at least one first circumferential projection in the labyrinth section;
   e) a circumference of the outer wall of the connecting pole increases in a direction pointing away from the connecting section in at least one section of the labyrinth section which is not provided with a first circumferential projection;
   f) the connecting pole is hollow on the inside and has an inner wall, a circumference of the inner wall of the connecting pole increases in the direction pointing away from the connecting section in at least a first section of the labyrinth section;
   g) the inner wall and the outer wall of the connecting pole run parallel at least in sections in a longitudinal direction of the labyrinth section; and
   h) the connecting pole has a second circumferential projection on the circumference of the outer wall in the attachment section between the connecting section and the labyrinth section, a first entire edge of the second circumferential projection being defined by the second horizontal plane and not in direct contact with the housing part, and a second edge of the second circumferential projection being defined by the labyrinth section,
   wherein a circumference of the inner wall increases at an angle in three sections, the three sections having differing angles; and
   wherein the circumference of the inner wall increases at a first angle in a first section, the circumference of the inner wall increases at a second angle in a second section which is below the first section, and the circumference of the inner wall increases at a third angle in a third section which is below the second section, wherein the first angle is smaller than the second angle and the second angle is smaller than the third angle.

2. The connecting pole as claimed in claim 1, characterized in that the circumference of the outer wall of the connecting pole increases in the direction pointing away from the connecting section in the regions which are not provided with a circumferential projection throughout the labyrinth section.

3. The connecting pole as claimed in claim 1, characterized in that the labyrinth section has a smaller extent in the longitudinal direction of the connecting pole than the attachment section.

4. The connecting pole as claimed in claim 1, characterized in that the at least one first circumferential projection has a hook-like profile.

5. The connecting pole as claimed in claim 1, characterized in that the first section, in which the circumference of the inner wall increases, does not project beyond the section in which the circumference of the outer wall increases in the longitudinal direction of the connecting pole.

6. The connecting pole as claimed in claim 1, characterized in that the first section, in which the circumference of the inner wall increases, projects beyond the section in which the circumference of the outer wall increases in the longitudinal direction of the connecting pole.

7. The connecting pole as claimed in claim 1, characterized in that the connecting pole is hollow on the inside and the circumference of the inner wall of the connecting pole increases in the direction of the labyrinth section in the connecting section.

8. The connecting pole as claimed in claim 1, characterized in that the circumference of the inner wall and/or of the outer wall increases in a monotonically linear or arcuate manner.

9. The connecting pole as claimed in claim 8, characterized in that the outer wall and/or the inner wall have/has a monolithic hyperboloid profile in the longitudinal direction of the connecting pole.

10. A rechargeable battery housing or part of said rechargeable battery housing comprising at least one connecting pole as claimed in claim 1, with the at least one connecting pole being embedded in a rechargeable battery housing part by means of injection-molding technology in the attachment section.

11. The connecting pole as claimed in claim 8, characterized in that the arcuate increase in the circumference is progressive in the direction pointing away from the connecting section.

12. The connecting pole as claimed in claim 8, characterized in that the outer wall and/or the inner wall are/is conically increased in size in the direction pointing away from the connecting section.

13. The connecting pole as claimed in claim 12, characterized in that the inner wall of the connecting pole is conically increased in size in the direction pointing away from the connecting section in at least a second section of the labyrinth section, with the inner wall forming a larger angle relative to the longitudinal axis of the connecting pole in the second section than in the first section.

14. The connecting pole as claimed in claim 1, characterized in that a wall of the labyrinth section is formed thinner than a wall of the connecting section.

15. The connecting pole as claimed in claim 1, characterized in that the labyrinth section is configured such as to form a labyrinth seal.

16. A rechargeable battery comprising:
   a housing;
   a pole terminal; and
   a connecting pole, the connecting pole comprising:

a connecting section in which a pole terminal can be attached to the connecting pole, said connecting section being defined between a first horizontal plane and a second horizontal plane, which is below the first horizontal plane;

an attachment section in which the connecting pole can be attached in the housing, said attachment section being defined between said second horizontal plane and a third horizontal plane, which is below the second horizontal plane, wherein said second horizontal plane is aligned with an outer surface of the housing, and wherein the attachment section has a labyrinth section;

an outer wall having at least one first circumferential projection in the labyrinth section, and wherein a circumference of the outer wall of the connecting pole increases in a direction pointing away from the connecting section in at least one section, of the labyrinth section which is not provided with a circumferential projection; and a second circumferential projection on the circumference of the outer wall in the attachment section, the second circumferential projection being entirely contained between the connecting section and the labyrinth section;

wherein the connecting pole is hollow on the inside and a circumference of an inner wall of the connecting pole increases in the direction pointing away from the connecting section in at least a first section of the labyrinth section, wherein the circumference of the inner wall increases at an angle in three sections, the three sections having differing angles; and the inner wall and the outer wall of the connecting pole run parallel at least in sections in a longitudinal direction of the labyrinth section; and wherein the circumference of the inner wall increases at a first angle in a first section, the circumference of the inner wall increases at a second angle in a second section which is below the first section, and the circumference of inner wall increases at a third angle in a third section which is below the second section, wherein the lift angle is smaller than the second angle and the second angle is smaller than the third angle.

\* \* \* \* \*

UNITED STATES PATENT AND TRADEMARK OFFICE
CERTIFICATE OF CORRECTION

PATENT NO. : 9,847,522 B2
APPLICATION NO. : 13/583192
DATED : December 19, 2017
INVENTOR(S) : Streuer et al.

Page 1 of 1

It is certified that error appears in the above-identified patent and that said Letters Patent is hereby corrected as shown below:

In the Claims

1. In Column 9, Line 18, in Claim 16, delete "section," and insert -- section --, therefor.

2. In Column 10, Line 18, in Claim 16, delete "inner" and insert -- the inner --, therefor.

3. In Column 10, Line 20, in Claim 16, delete "lift" and insert -- first --, therefor.

Signed and Sealed this
Eleventh Day of December, 2018

Andrei Iancu
*Director of the United States Patent and Trademark Office*